US012476410B2

(12) United States Patent
Luellich et al.

(10) Patent No.: US 12,476,410 B2
(45) Date of Patent: Nov. 18, 2025

(54) PRE-ASSEMBLED PLUG ASSEMBLY FOR A PLUG EXTENDING THROUGH A WALL

(71) Applicant: TE Connectivity Germany GmbH, Bensheim (DE)

(72) Inventors: Eike Tim Luellich, Bensheim (DE); Dirk Duenkel, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 495 days.

(21) Appl. No.: 17/836,036

(22) Filed: Jun. 9, 2022

(65) Prior Publication Data

US 2022/0399673 A1 Dec. 15, 2022

(30) Foreign Application Priority Data

Jun. 10, 2021 (DE) ........................ 102021115009.4

(51) Int. Cl.

*H01R 13/508* (2006.01)
*H01R 12/57* (2011.01)
*H01R 13/52* (2006.01)
*H01R 13/73* (2006.01)

(52) U.S. Cl.

CPC ........... *H01R 13/508* (2013.01); *H01R 12/57* (2013.01); *H01R 13/5202* (2013.01); *H01R 13/73* (2013.01)

(58) Field of Classification Search

CPC .. H01R 13/508; H01R 13/5202; H01R 13/73; H01R 12/57
USPC .......................................................... 439/188
See application file for complete search history.

(56) References Cited

U.S. PATENT DOCUMENTS 4,743,210 A 5/1988 Schild et al.
4,822,293 A * 4/1989 Robson .................. H01R 13/73 439/565
5,105,339 A * 4/1992 Olsson ................. H05K 7/1439 361/752
5,316,499 A 5/1994 Scannelli et al.
5,766,035 A * 6/1998 Alibert ................... H01R 13/74 439/362
6,206,731 B1 3/2001 Kuo
6,491,551 B1 * 12/2002 Julian .................. H01R 13/746 439/737

(Continued)

FOREIGN PATENT DOCUMENTS

CN 107017503 A 8/2017
CN 206758747 U 12/2017

(Continued)

OTHER PUBLICATIONS

Germany's Office Action, Application No. 102021115009.4, Dated: Dec. 21, 2021, 3 pages.

(Continued)

*Primary Examiner* — Gary F Paumen
(74) *Attorney, Agent, or Firm* — Barley Snyder

(57) ABSTRACT

A plug assembly for an electrical plug extending through a wall includes a first housing part having a contact chamber receiving an electrical contact, a second housing part having a receptacle in which the first housing part is received, and a base plate fastening the plug assembly to the wall. The plug assembly is pre-assembled by fastening the first housing part and the second housing part on different sides of the base plate.

20 Claims, 5 Drawing Sheets

(56) References Cited

U.S. PATENT DOCUMENTS

| | | | | |
|---|---|---|---|---|
| 6,579,111 | B2 * | 6/2003 | Fukamachi | H01R 13/62933 439/549 |
| 7,097,509 | B2 * | 8/2006 | Newton, Jr. | H01R 13/7197 439/620.01 |
| 8,854,835 | B2 * | 10/2014 | Feldstein | H01R 12/724 174/355 |
| 8,951,065 | B2 * | 2/2015 | Tsuge | H01R 13/631 439/565 |
| 9,653,858 | B2 | 5/2017 | Hanke et al. | |
| 9,966,715 | B2 * | 5/2018 | Ishibashi | H01R 13/512 |
| 9,979,146 | B2 | 5/2018 | Vishwanath et al. | |
| 10,348,020 | B2 | 7/2019 | Zhu et al. | |
| 11,444,407 | B2 * | 9/2022 | Zhou | H01R 24/52 |
| 2006/0205271 | A1 * | 9/2006 | Hsu | H01R 13/73 439/573 |
| 2014/0342581 | A1 * | 11/2014 | Clyatt | H01R 24/50 439/63 |
| 2018/0019557 | A1 | 1/2018 | Ishibashi | |
| 2021/0006003 | A1 | 1/2021 | Zhou et al. | |

FOREIGN PATENT DOCUMENTS

| | | | |
|---|---|---|---|
| DE | 10042566 | A1 | 3/2002 |
| EP | 0727849 | A2 | 8/1996 |
| EP | 1394906 | A1 | 3/2004 |
| EP | 3037721 | A1 | 6/2016 |
| FR | 2841395 | A1 | 12/2003 |
| JP | 2016139541 | A1 | 8/2016 |
| WO | 2005083844 | A1 | 9/2005 |
| WO | 2015032516 | A1 | 3/2015 |

OTHER PUBLICATIONS

Examination Report from the Intellectual Property Office of India dated Dec. 28, 2022, corresponding to Application No. 202244032259, 6 pages.

Extended European Search Report dated Oct. 28, 2022, corresponding to Application No. 22177818.6-1201, 8 pages.

Japanese Office Action dated May 23, 2023 with English translation, corresponding to Application No. 2022-092028, 16 pages.

Chinese Office Action dated Apr. 11, 2025 with English translation, corresponding to Application No. 202210637244.5, 13 pages.

* cited by examiner

PRE-ASSEMBLED PLUG ASSEMBLY FOR A PLUG EXTENDING THROUGH A WALL

CROSS-REFERENCE TO RELATED APPLICATIONS

This application claims the benefit of the filing date under 35 U.S.C. § 119(a)-(d) of German Patent Application No. 102021115009.4, filed on Jun. 10, 2021.

FIELD OF THE INVENTION

The invention relates to a plug assembly for an electrical plug extending through a wall.

BACKGROUND

Electrical plugs are used in various applications from the low-voltage range to the high-voltage range for the electrical coupling of electrical components. In numerous applications, it is necessary for the sides of the electrical plug to be arranged on different sides of a wall, for example a housing wall of a unit. Accordingly, these applications require a multi-part configuration of the electrical plug, wherein the individual parts are mounted and assembled on the wall by the customer. The problem, however, is that the plug is only assembled by the customer. This means that no final quality check can be carried out by the manufacturer. If a defect should occur, it is no longer possible to determine whether the defect occurred during manufacture or as a result of assembly by the customer.

SUMMARY

A plug assembly for an electrical plug extending through a wall includes a first housing part having a contact chamber receiving an electrical contact, a second housing part having a receptacle in which the first housing part is received, and a base plate fastening the plug assembly to the wall. The plug assembly is pre-assembled by fastening the first housing part and the second housing part on different sides of the base plate.

BRIEF DESCRIPTION OF THE DRAWINGS

The invention will now be described by way of example with reference to the accompanying Figures, of which.

DETAILED DESCRIPTION OF THE EMBODIMENT(S)

In the following, the invention is described in more detail by embodiments with reference to the attached Figures. In the Figures, elements which correspond to each other in terms of structure and/or function are given the same reference signs.

The combinations of features shown and described in the individual embodiments are for explanatory purposes only. A feature of an embodiment can be omitted if its technical effect is not important for a particular application. Conversely, an additional feature may be added to an embodiment if its technical effect is preferred or necessary for a particular application.

Figure 1:
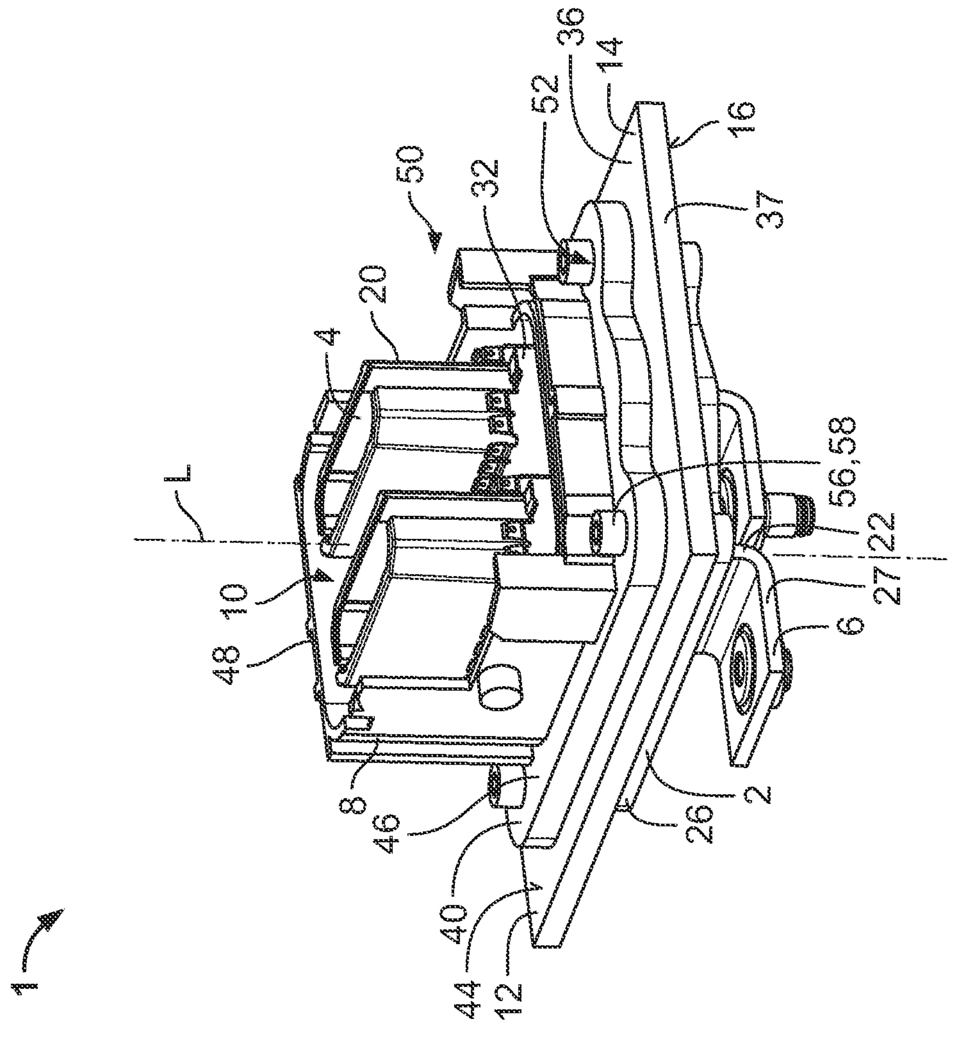
FIG. 1 is a perspective view of a pre-assembled plug assembly according to an embodiment.
Figure 2:
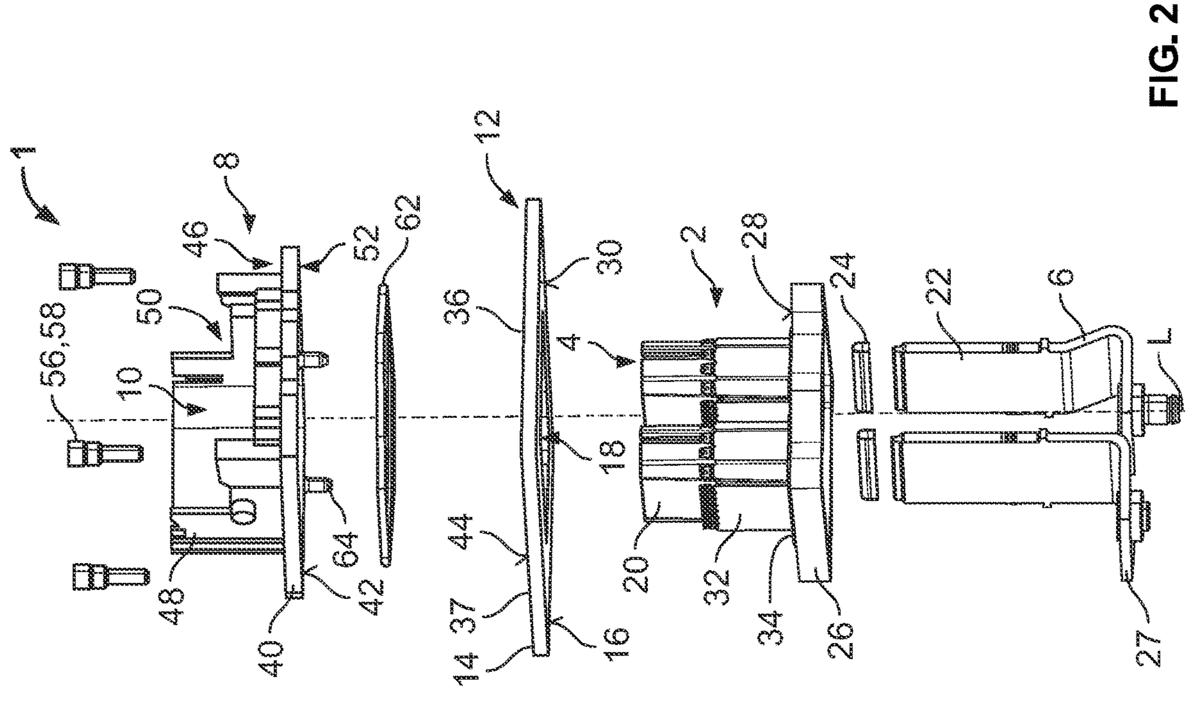
FIG. 2 is an exploded perspective view of the plug assembly.
Figure 3:
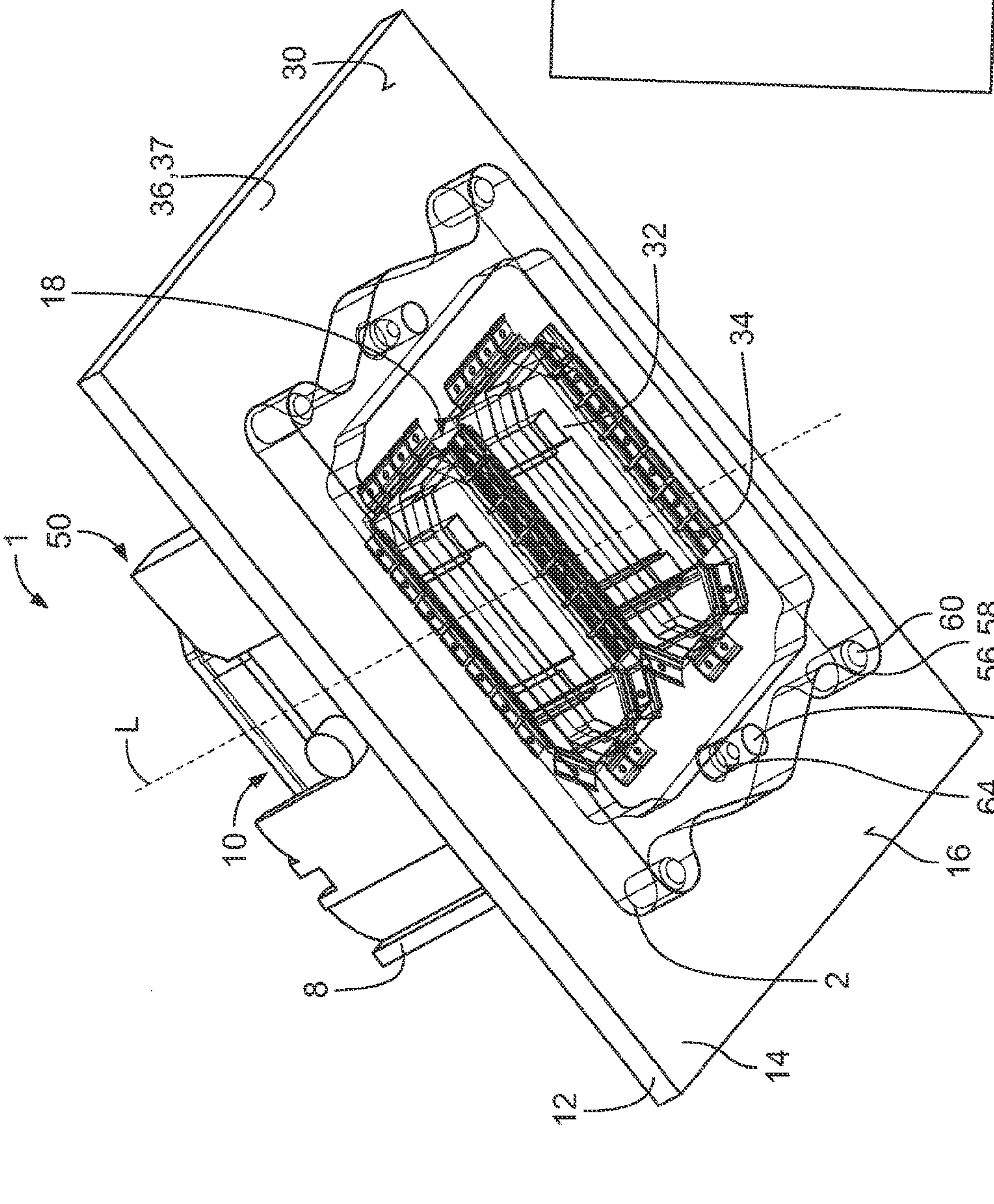
FIG. 3 is a perspective view of a base plate of the plug assembly.

First, a pre-assembled plug assembly 1 for an electrical plug 3 extending through a wall (see FIG. 5) is explained in more detail in an embodiment with reference to FIGS. 1 to 3.

The plug assembly 1 comprises a first housing part 2 with at least one contact chamber 4, which is configured to receive an electrical contact 6, and a second housing part 8 with at least one receptacle 10, in which the first housing part 2 is received at least in sections. Furthermore, the pre-assembled plug assembly 1 comprises a base plate 12 for fastening the plug assembly 1 to a wall, wherein the first housing part 2 and the second housing part 8 are fastened to different sides of the base plate 12. Accordingly, the base plate 12 may be arranged along a longitudinal axis L between the first housing part 2 and the second housing part 8, in particular clamped.

By using the base plate 12, the plug assembly 1 can already be pre-assembled by the manufacturer, wherein the base plate 12 replaces or simulates the part of the wall to which the housing parts 2, 8 should be fastened by the customer. Accordingly, the plug assembly 1 can already be assembled by the manufacturer, which allows a final quality check by the manufacturer. Furthermore, the pre-assembled plug assembly 1 can reduce the amount of assembly work required by the customer, who only has to fasten the base plate 12 to the wall. It is no longer necessary for the customer to assemble the housing parts, which means that errors can be avoided. An opening that penetrates the wall no longer must meet specific requirements of the plug assembly 1, such as requirements for fastening the housing parts 2, 8 and/or shielding requirements, since these problems are now solved by the base plate 12.

"Pre-assembled" within the meaning of the application means, in particular, that the plug assembly 1 is assembled prior to fastening to the wall. Consequently, the plug assembly 1 can be offered and sold in a pre-assembled state as a single module, wherein the customer can fasten the plug assembly 1 to the wall. The pre-assembled plug assembly 1 may also be referred to as a plug assembly 1 herein.

In an embodiment, the base plate 12 projects substantially perpendicular to the longitudinal axis L beyond the first housing part 2 and/or the second housing part 8. As can be seen in FIG. 1, the base plate 12 can project beyond the first housing part 2 and the second housing part 8 with a circumferential collar 14 on either side substantially perpendicular to the longitudinal axis L. Accordingly, the collar 14 provides a supporting surface 16 with which the base plate 12 can rest on the wall. In an embodiment, the base plate 12 may have a planar configuration so that it can rest evenly on the wall.

The base plate 12 can comprise a window 18 through which the contact chamber 4 protrudes, as shown in FIGS. 2 and 3. In this exemplary configuration, the first housing part 2 is provided with two contact chambers 4 arranged parallel to each other and projecting through a common window 18 of the base plate 12. Each contact chamber 4 is bounded by a chamber wall 20 extending around the respective contact chamber 4. In this context, the contact chambers 4 may be open substantially parallel to the longitudinal axis L so that the latter is accessible from both sides along the longitudinal axis L. An electrical contact 6, for example a blade contact 22, can be fixed in each of the contact chambers 4.

The blade contact 22 can be provided with an electrically insulating cap 24 shown in FIG. 2 which, together with the chamber wall 20, forms a contact protection. The shape of the electrical contacts 6 may be of any configuration, depending on the application requirements. For example, the contacts 6 may be configured for fastening to a bus bar disposed in a housing interior of a unit. Since the position and orientation of the bus bar inside the housing is specified by the customer, the electrical contact 6 can have a connection section 27 which projects out of the contact chamber 4 and has an application-specific configuration. For example, the connection section 27 can be curved and have a screw opening for screwing to the bus bar.

To improve the stability of the pre-assembled plug assembly 1, in an embodiment, the first housing part 2 and the second housing part 8 abut the base plate 12 in a planar manner.

As best seen in FIG. 2, the first housing member 2 can comprise a first flange 26 extending substantially parallel to the base plate 12, from which the contact chambers 4 extend away substantially parallel to the longitudinal axis L. The first flange 26 may thereby project laterally beyond the window 18, i.e. substantially perpendicular to the longitudinal axis L, and may form a first flange surface 28 with which the first flange 26 rests on a flat side 30 of the base plate 12.

The window 18 may be configured such that it includes a frame supporting the contact chambers 4 at least in a direction substantially perpendicular to the longitudinal axis L. Thus, the frame can at least in sections prevent a lateral movement of the contact chamber 4, i.e. a movement substantially perpendicular to the longitudinal axis L, relative to the base plate 12. The frame of the window 18 can completely surround the at least one contact chamber 4 so that relative movement of the at least one contact chamber 4 to the base plate 12 can be prevented on all sides substantially perpendicular to the longitudinal axis L.

In order to improve the EMC properties of a plug system, at least one shield 32 may be provided for contacting a shield of a mating plug, as shown in FIGS. 1 and 2. Thus, in this exemplary configuration, each contact chamber 4 is provided with a shield 32 extending around the chamber wall 20. The shield 32 thus forms a sleeve which permits circumferential contacting.

The shield 32 can rest on the first flange surface 28. For this purpose, the shield 32 may be provided with contacting lugs 34 projecting laterally substantially perpendicular to the longitudinal axis L. In FIG. 3, the pre-assembled plug assembly 1 is shown in a schematic perspective view, with the first housing part 2 shown transparently. For the sake of clarity, the electrical contacts 6 have been removed in FIG. 3. The contacting lugs 34 can be configured such that they are clamped between the first flange surface 28 and the flat side 30 when the plug assembly 1 is assembled. Consequently, the shield 32 can be fixed without additional fastening devices.

In an embodiment, the base plate 12 may be formed of an electrically conductive material. For example, the base plate 12 can be a metal plate 36 which, in addition to being fastened to the wall, can serve as a shield contact 37 to improve the EMC properties. If the wall is also electrically conductive, the base plate 12 serves as an electrically conductive intermediate piece between the shield 32 and the wall.

As can be seen in FIG. 3, the shield 32 may have a plurality of contacting lugs 34 distributed along the circumference of the shield 32. If the base plate 12 has a common window 18 for the two contact chambers 4, the contacting lugs 34 facing the opposite shield 32 do not directly contact the base plate 12. Thus, they are not clamped between the first flange 26 and the base plate 12. The contacting lugs 34 of the shields 32 facing each other may overlap each other. Such a configuration of the base plate 12 with a common window 18 for the contact chambers 4 facilitates the assembly of the plug assembly 1.

Figure 4:
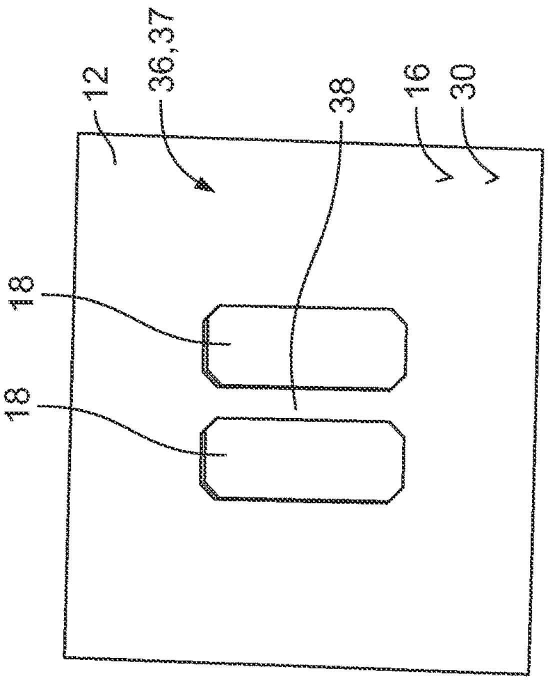
FIG. 4 is a top view of a base plate according to another embodiment.

If the shield 32 contact is to be improved, each contacting lug 34 may contact the base plate 12. For this purpose, the base plate 12 can optionally have a plurality of separate windows 18 through each of which a contact chamber 4 can be inserted. A section of such an exemplary configuration of a base plate 12 is shown in FIG. 4. As can be seen, the windows 18 are each configured to receive a contact chamber 4 and are separated from each other by a web 38. Accordingly, the contacting lugs 34 of the shields 32 facing each other can contact the flat side 30 of the web 38 and be clamped between the web 38 and the first flange 26. The at least one shield 32 may protrude through the window 18, wherein the contacting lugs 34 serve as a stop that prevents the at least one shield 32 from slipping through the window 18.

The second housing part 8 is best seen in FIGS. 1 and 2. It has a second flange 40 arranged substantially parallel to the base plate 12. The second flange 40 has a second flange surface 42, with which the first flange 40 rests, at least in sections, on a second flat side 44 facing the second flange surface 42. On a side 46 of the second flange 40 facing away from the base plate 12, a housing wall 48 may project substantially parallel to the longitudinal axis L in a direction away from the base plate 12. The housing wall 46 may extend around the receptacle 10.

For a compact plug system, it is useful if the plug system is angled. For this purpose, the housing wall can be provided with a recess 50 substantially perpendicular to the longitudinal axis L on at least one side. In particular, the wall can extend around the window 18 or windows 18 in the case of a base plate 12 according to FIG. 4.

The second flange 40 can comprise at least one fastening opening 52 that is open at least to the second flange surface 42. In this configuration, there are four fastening openings 52 that are arranged at respective corners of the second flange 40 and penetrate the same. The base plate 12 may also be penetrated by fastening openings 54. Thus, a fastening device 56, such as screws 58, may be inserted through the fastening openings 52 and fastened into the first flange 26. Thus, the first flange 26 may be provided with screw-in openings 60 into which the screws 58 may be screwed. The screw-in opening 60 may be closed, in particular on the side facing away from the base plate 12, so that no liquids can flow through the screw-in opening 60 into the interior of the housing.

In another embodiment not shown, the housing part which is to be accessible from the outside when the plug assembly 1 is fastened to the wall can have the screw-in opening 60 which is closed on the side facing away from the base plate 12. In this way, liquids can be prevented from entering the screw-in opening 60 from the outside and an additional seal for sealing the screw-in opening and the fastening openings can be dispensed with.

The first housing part 2 and the second housing part 8 can be fastened together via the fastening device 56 and the screw-in opening 60, wherein the base plate 12 is clamped between the flanges 26, 40.

In an embodiment, the screw-in opening 60 may be a threaded hole. Alternatively, the fastening device 56 may be configured as a self-tapping screw, whereby when screwed into solid material or into a pilot hole, the screw-in opening 60 is formed.

In order to prevent liquids from entering the housing interior through the window 18, a seal 62 may be provided between the flange and the base plate 12. In this embodiment, it is provided that the second housing part 8 is to be accessible from the outside. Therefore, the seal 62 is provided between the second flange 42 and the base plate 12. For positioning the seal 62, the flange surface can have a groove in which the seal 62 can be received. In particular, the groove can be configured circumferentially so that the entry of liquids from all sides can be blocked essentially perpendicular to the longitudinal axis L. The seal 62 can be a separate sealing ring or can be injected.

In order to facilitate assembly of the plug assembly 1, one housing part 8 may comprise positioning journals 64 which protrude through the base plate 12 and are received in corresponding positioning openings 66 (see FIG. 3) of the other housing part 2. The positioning journals 64 may, for example, project substantially parallel to the longitudinal axis L from the flange surface 42 of the corresponding housing part 8. The positioning journals 64 can be used to ensure that the housing parts 2, 8 are correctly positioned relative to each other before they are secured together. For example, it can be ensured that the screw-in opening 60 and the fastening openings 54 are aligned with each other.

Figure 5:
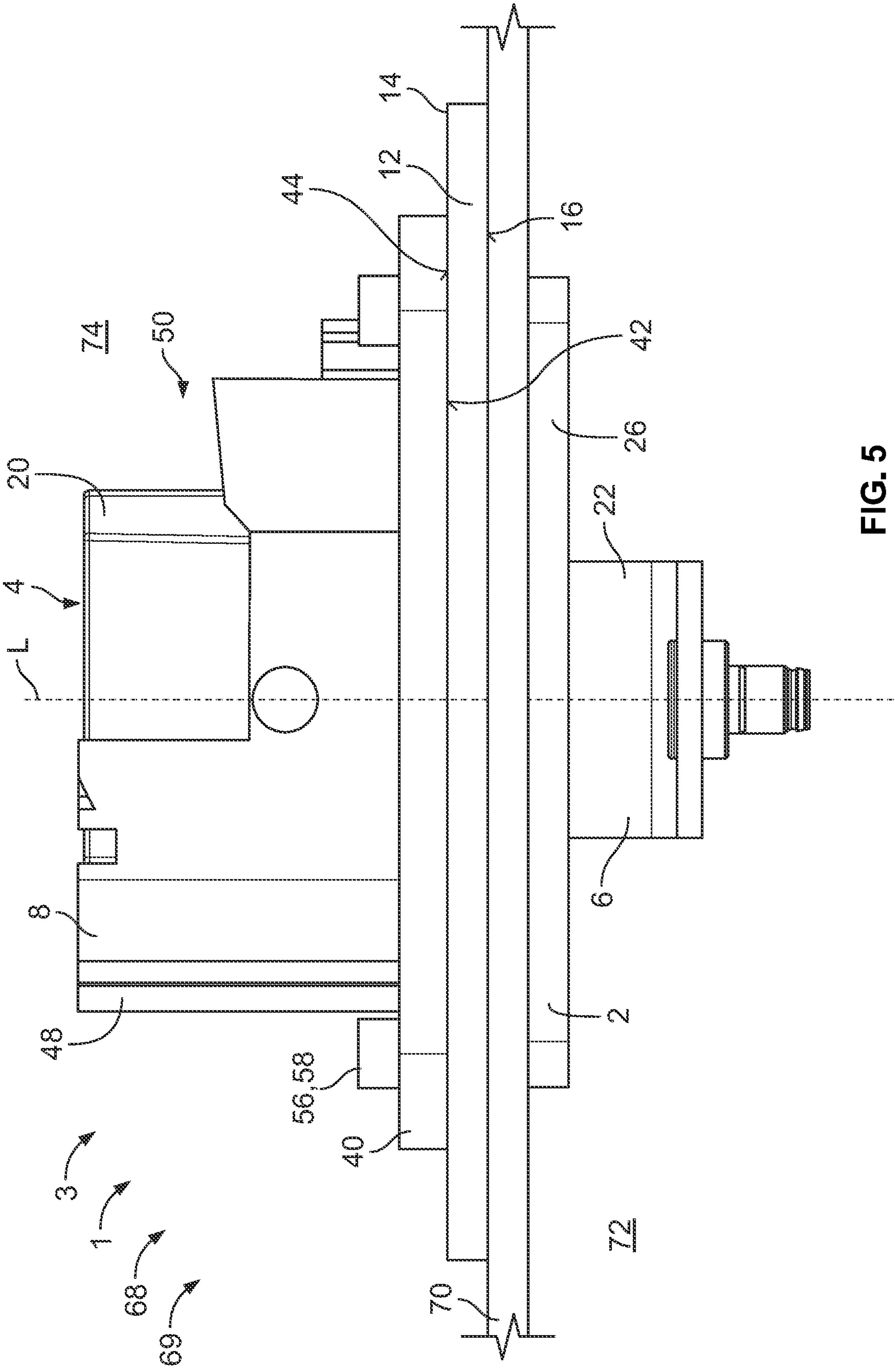
FIG. 5 is a side view of the plug assembly mounted on a wall.

In FIG. 5, an assembly 68 comprising a plug assembly 1 and a wall 70 is shown in a schematic side view. The wall 70 can be, for example, a housing wall of a unit and separates a housing interior 72 from a housing exterior 74. The wall 70 is penetrated by an opening 76, shown in FIG. 6, that is larger than the first housing part 2 and smaller than the base plate 12. This allows the base plate 12 to rest on the wall 70, with the first housing part 2, in particular the first flange 26, being arranged in the housing interior 72 and the second housing part 8 being arranged in the housing exterior 74. Furthermore, a device 69 is shown with a base plate 12 fastened to a wall 70.

The base plate 12 can be fastened to the wall 70 in a materially bonded manner. For example, the base plate 12 can be welded or glued. In an embodiment, the material bond is sealing, so that the base plate 12 sealingly covers the opening 76. Alternatively, a seal, for example a sealing ring, may be provided around the opening 76 between the base plate 12 and the wall 70.

Figure 6:
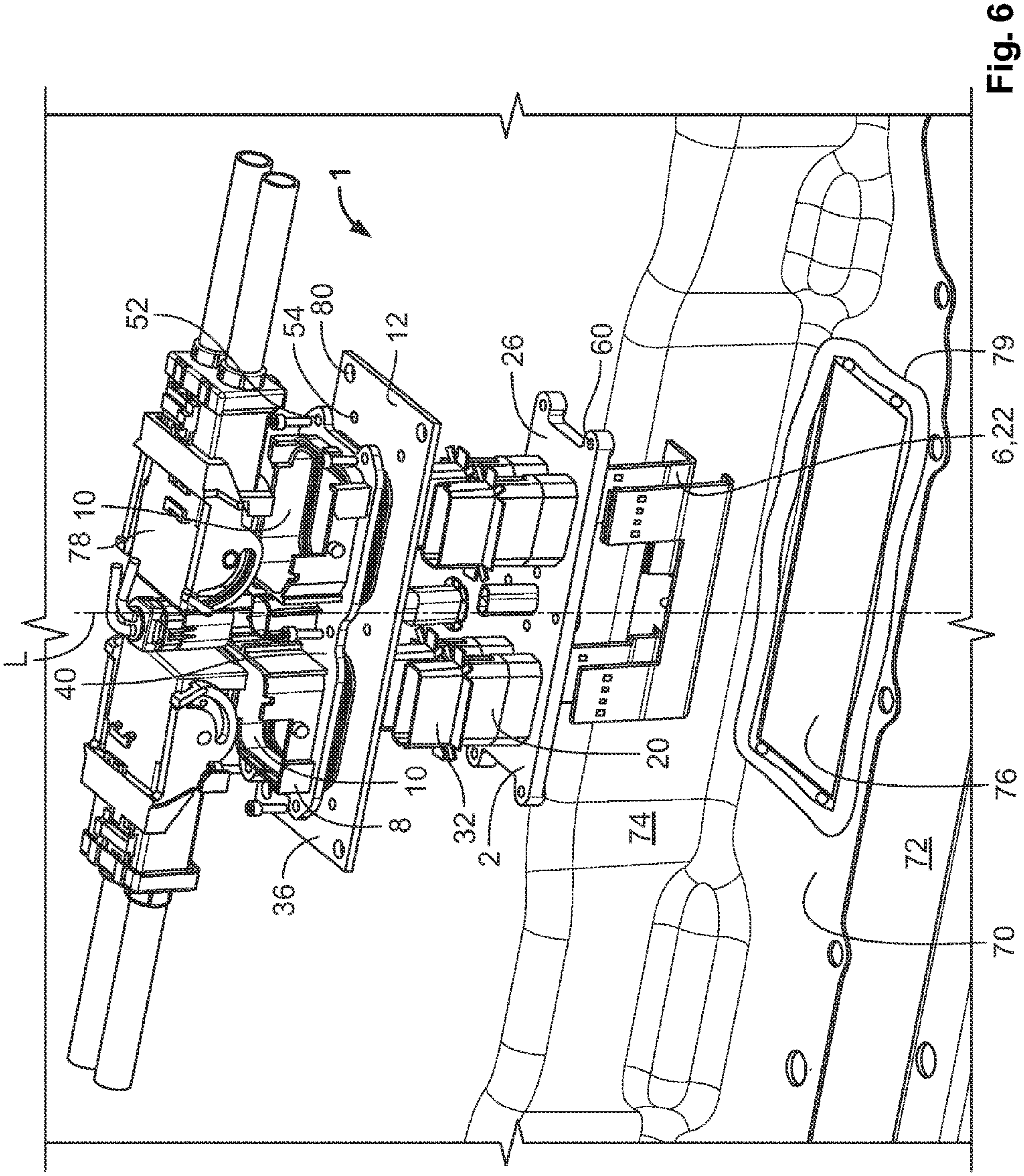
FIG. 6 is an exploded perspective view of a plug assembly according to another embodiment.

In FIG. 6, another exemplary embodiment of a plug assembly 1 is shown in an exploded view. The plug assembly 1 is configured to be coupled with two mating plugs 78. For this purpose, the second housing part 2 is provided with two receptacles 10 with a housing wall 48 which is provided with the recess 50 on sides facing away from each other. In each receptacle 10, two contact chambers 4 of the first housing part 2 are to be received, respectively. Consequently, the first housing part 2 is provided with four contact chambers 4, into each of which an electrical contact 6 can be inserted.

In order to seal the opening 76, a seal 79 is provided which is arranged between the first flat side 30 of the base plate 12 and outer surface of the wall 70.

According to this exemplary embodiment, the base plate 12 can be fastened to the wall 70 by a fastening device, such as screws or bolts. An assembly opening 80 is provided in the base plate 12 for this purpose.

What is claimed is:

1. A plug assembly for an electrical plug extending through a wall, comprising:
- a first housing part having a contact chamber receiving an electrical contact;
- a second housing part having a receptacle in which the first housing part is received; and
- a base plate fastening the plug assembly to the wall, the plug assembly is pre-assembled by fastening the first housing part and the second housing part on different sides of the base plate, the first housing part and the second housing part each abut respective different sides of the base plate.

2. The plug assembly of claim 1, wherein the base plate projects laterally beyond the first housing part and/or the second housing part.

3. The plug assembly of claim 1, further comprising a shield surrounding the contact chamber and abutting the base plate.

4. The plug assembly of claim 3, wherein the shield is clamped between the base plate and the first housing part or the second housing part.

5. The plug assembly of claim 1, wherein the base plate is formed of an electrically conductive material.

6. The plug assembly of claim 1, wherein the first housing part has a first flange and the second housing part has a second flange.

7. The plug assembly of claim 6, wherein the base plate is arranged between the first flange and the second flange.

8. The plug assembly of claim 7, wherein the first housing part and the second housing part are fastened to each other by a fastening device extending through the base plate.

9. The plug assembly of claim 7, wherein the first housing part and the second housing part are screwed together.

10. The plug assembly of claim 7, wherein the first flange and/or the second flange has a screw-in opening.

11. The plug assembly of claim 10, wherein the screw-in opening is closed on a side facing away from the base plate.

12. The plug assembly of claim 7, wherein the first flange and/or the second flange has a positioning journal protruding through the base plate.

13. The plug assembly of claim 12, wherein the positioning journal is received in the other of the first flange and/or the second flange.

14. The plug assembly of claim 1, wherein the base plate has a window.

15. The plug assembly of claim 14, wherein the contact chamber protrudes through the window.

16. The plug assembly of claim 15, wherein the contact chamber is one of a plurality of contact chambers of the first housing part.

17. The plug assembly of claim 16, wherein the window is one of a plurality of separate windows of the base plate, each window has a contact chamber protruding therethrough.

18. An assembly, comprising:
- a housing having a wall penetrated by an opening extending from a housing exterior into a housing interior; and
- a plug assembly including a first housing part having a contact chamber receiving an electrical contact, a second housing part having a receptacle in which the first housing part is received, and a base plate fastening the plug assembly to the wall, the plug assembly is pre-assembled by fastening the first housing part and the second housing part on different sides of the base plate, the first housing part or the second housing part is fastened in the housing exterior and the other of the first housing part and the second housing part is fastened in the housing interior.

19. The assembly of claim 18, further comprising a seal arranged between the base plate and the wall.

20. A device, comprising:

a wall; and a plug assembly including a first housing part having a contact chamber receiving an electrical contact, a second housing part having a receptacle in which the first housing part is received, and a base plate fastening the plug assembly to the wall, the plug assembly is pre-assembled by fastening the first housing part and the second housing part on different sides of the base plate, the first housing part and the second housing part each abut respective different sides of the base plate.

* * * * *